US011327160B2

(12) United States Patent
Sato

(10) Patent No.: US 11,327,160 B2
(45) Date of Patent: May 10, 2022

(54) OPTICAL SENSOR AND ELECTRONIC DEVICE

(71) Applicant: SHARP KABUSHIKI KAISHA, Sakai (JP)

(72) Inventor: Hideki Sato, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 817 days.

(21) Appl. No.: 16/306,518

(22) PCT Filed: Apr. 18, 2017

(86) PCT No.: PCT/JP2017/015535
§ 371 (c)(1),
(2) Date: Nov. 30, 2018

(87) PCT Pub. No.: WO2017/208651
PCT Pub. Date: Dec. 7, 2017

(65) Prior Publication Data
US 2019/0293771 A1 Sep. 26, 2019

(30) Foreign Application Priority Data
Jun. 2, 2016 (JP) .............................. JP2016-111290

(51) Int. Cl.
G01S 7/487 (2006.01)
G01S 17/10 (2020.01)

(52) U.S. Cl.
CPC ............ *G01S 7/4876* (2013.01); *G01S 17/10* (2013.01)

(58) Field of Classification Search
CPC ............................... G01S 7/4876; G01S 17/10
See application file for complete search history.

(56) References Cited

U.S. PATENT DOCUMENTS 9,417,326 B2* 8/2016 Niclass .................. G01S 7/489
2014/0103196 A1* 4/2014 Soga ................ H01L 31/02019
250/206
2018/0364340 A1* 12/2018 Ichiyanagi ............ G01S 7/4814

FOREIGN PATENT DOCUMENTS

JP 5644294 B2 12/2014

* cited by examiner

Primary Examiner — Yuqing Xiao
Assistant Examiner — Tiffany N Tucker
(74) Attorney, Agent, or Firm — ScienBiziP, P.C.

(57) ABSTRACT

A TOF sensor includes: a light-emitting element that emits light in accordance with reference pulses; a first light-receiving unit that outputs pulses in response to light incident thereon; a first digital computation unit that calculates the number of third output pulses of the first light-receiving unit in response to reflected light incident thereon; and a distance computation unit that calculates the distance from this device to the object if the number of third output pulses is greater than a first reference value.

10 Claims, 12 Drawing Sheets

OPTICAL SENSOR AND ELECTRONIC DEVICE

TECHNICAL FIELD

The present invention relates to optical sensors and, in particular, relates to an optical sensor using the avalanche effect.

BACKGROUND ART

In the past, in optical communications and time-of-flight measurement (TOF), as a light-receiving element that detects weak light quickly, an avalanche photodiode using the avalanche amplification (avalanche) effect of a photodiode has been used.

When a reverse bias voltage less than a breakdown voltage (a breakdown voltage) is applied to the avalanche photodiode, the avalanche photodiode operates in linear mode and an output current fluctuates in such a way as to have a positive correlation with the amount of light received. On the other hand, when a reverse bias voltage more than or equal to the breakdown voltage is applied to the avalanche photodiode, the avalanche photodiode operates in Geiger mode. Since the avalanche photodiode in Geiger mode causes an avalanche phenomenon in response even to a single photon incident thereon, a large output current is obtained. For this reason, the avalanche photodiode in Geiger mode is called a single photon avalanche diode (SPAD).

By adding a quenching resistance so as to be connected in series with the avalanche photodiode in Geiger mode, it is possible to obtain a binary pulse output. A light-receiving unit 111 using the avalanche photodiode in Geiger mode will be described based on FIG. 12. FIG. 12 is a circuit diagram depicting a configuration example of the light-receiving unit 111 using the avalanche photodiode in Geiger mode. The light-receiving unit 111 is, as depicted in FIG. 12, made up of a photodiode PD111, an active quenching resistance R111 (a resistance component of a MOS transistor), and a buffer BUF111. A bias voltage $V_H$ more than or equal to a breakdown voltage is applied to the photodiode PD111, and a reference voltage $V_G$ is applied to the resistance R111.

The photodiode PD111 is an avalanche photodiode in Geiger mode, and causes an avalanche phenomenon in response to a single photon incident thereon in the application of the bias voltage $V_H$ more than or equal to the breakdown voltage and causes a current to flow therethrough. As a result of the current flowing through the active quenching resistance R111 connected in series with the photodiode PD111, the inter-terminal voltage of the active quenching resistance R111 increases. With an increase in the inter-terminal voltage, the bias voltage of the photodiode PD111 decreases and the avalanche phenomenon ceases. When the current by the avalanche phenomenon ceases, the inter-terminal voltage of the active quenching resistance R111 decreases and the state returns to a state in which the bias voltage more than or equal to the breakdown voltage is applied to the photodiode PD111 again. In this way, by the buffer BUF111, a change in the voltage between the photodiode PD111 and the active quenching resistance R111 is extracted as a binary pulse output.

Although the light-receiving unit 111 can detect weak light, the light-receiving unit 111 cannot distinguish between a pulse (valid data) output from the light-receiving unit 111 by a reflected light component of an object and a pulse (invalid data) output by components other than the reflected light from the object, such as signal light, ambient light, and heat.

Thus, a means of removing the invalid data is described in PTL 1. A photodetector described in PTL 1 includes a plurality of single photon avalanche diodes (SPADs) arranged in an array and regards, as valid data, a time at which a predetermined number of SPADs respond at the same time.

CITATION LIST

Patent Literature

PTL 1: Japanese Patent Application No. 5644294 (registered on Nov. 14, 2014)

SUMMARY OF INVENTION

Technical Problem

However, the above-described existing technique has the following problem. That is, when a pulse output which is obtained by the addition of the quenching resistance is used in a TOP sensor, it is necessary to acquire a given number of pieces of valid data to maintain highly accurate measurement because the more valid data, the higher the accuracy of the TOP sensor. However, the problem of the technique described in PTL 1 is that it takes too much time to acquire a given number of pieces of valid data required for high precision measurement because the probability of detection of a pulse of a reflected light component is greatly reduced.

The present invention has been made in view of the above-mentioned problem and an object thereof is to implement an optical sensor that can perform highly accurate distance measurement in a short time.

Solution to Problem

To solve the above-described problem, an optical sensor according to an aspect of the present invention includes: a light-emitting unit that emits light in accordance with reference pulses; a first light-receiving unit that outputs pulses in response to light incident thereon; a first calculation unit that calculates, based on the number of first output pulses of the first light-receiving unit in response to light incident thereon including reflected light, which is the emitted light of the light-emitting unit reflected from an object, and ambient light, the number of second output pulses of the first light-receiving unit in response to the ambient light incident thereon, and the ratio between a light-emission period and a non-light-emission period of the light-emitting unit, the number of third output pulses of the first light-receiving unit in response to the reflected light incident thereon; and a distance calculation unit that calculates the distance from this device to the object based on the result of comparison between the reference pulses and output pulses of the first light-receiving unit in the light-emission period if the number of third output pulses is greater than a first reference value.

Advantageous Effects of Invention

According to an aspect of the present invention, the effect of being capable of performing highly accurate distance measurement in a short time is obtained.

DESCRIPTION OF EMBODIMENTS

Figure 1:
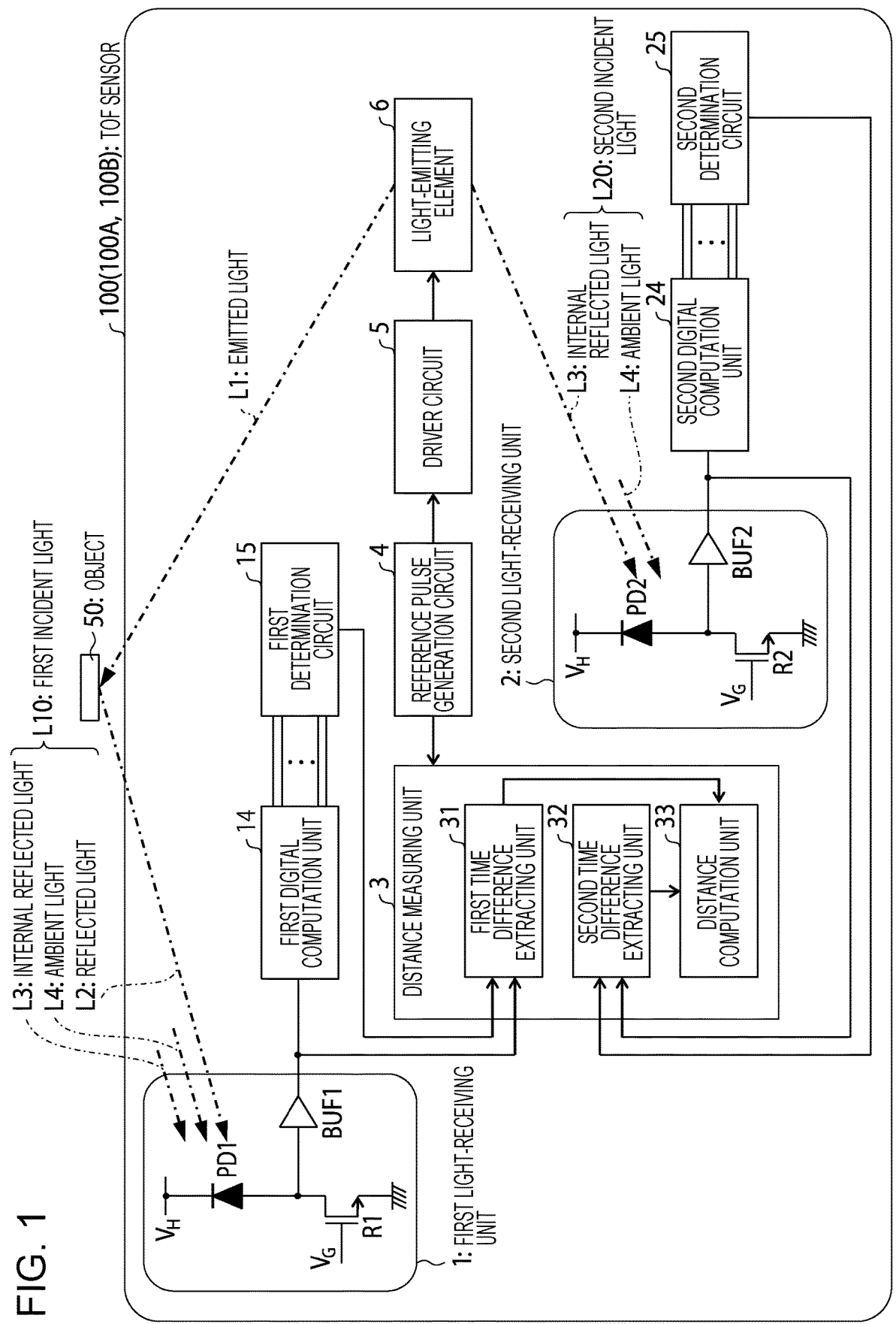
FIG. 1 is a block diagram depicting the schematic configuration of a TOF sensor according to Embodiment 1 of the present invention.

Hereinafter, embodiments of the present invention will be described in detail. It is to be noted that, for convenience of explanation, a member having the same function as the member described in each embodiment will be identified with the same reference character as that member and an explanation thereof will be omitted as appropriate.

Embodiment 1

Embodiment 1 of the present invention will be described with reference to FIGS. 1 to 7.
(Schematic Configuration of a TOF Sensor)

A TOF sensor 100 (an optical sensor) measures the distance between the TOF sensor 100 and an object 50 by calculating the distance based on a time difference between a time at which light is emitted toward an object and a time at which reflected light, which is the emitted light reflected from the object, is received. The TOF sensor 100 is used in an electronic device such as a smartphone or a camera, for example.

First, a brief description of the schematic configuration of the TOF sensor 100 is as follows.

The TOF sensor 100 includes: a light-emitting element 6 (a light-emitting unit) that emits light in accordance with reference pulses; a first light-receiving unit 1 that outputs first received-light pulses in response to light incident thereon; a first digital computation unit 14 (a first calculation unit) that calculates, based on the number of first received-light pulses (the number of first output pulses) of the first light-receiving unit 1 in response to light incident thereon including reflected light L2, which is the emitted light of the light-emitting element 6 reflected from an object, and ambient light L4, the number of first received-light pulses (the number of second output pulses) of the first light-receiving unit 1 in response to the ambient light L4 incident thereon, and the ratio between a light-emission period T1 and a non-light-emission period T2 of the light-emitting element 6, the number of first effective pulses (the number of third output pulses) which is the number of first received-light pulses of the first light-receiving unit 1 in response to the reflected light L2 incident thereon; and a distance computation unit 33 (a distance calculation unit) that calculates the distance from this device to the object based on the result of comparison between the reference pulses and the first received-light pulses of the first light-receiving unit 1 in the light-emission period T1 if the number of first effective pulses (the number of third output pulses) is greater than a first reference value.

Moreover, the TOF sensor 100 includes: a second light-receiving unit 2 that outputs second received-light pulses in response to light incident thereon; and a second digital computation unit 24 (a second calculation unit) that calculates, based on the number of second received-light pulses (the number of first internal output pulses) of the second light-receiving unit 2 in response to internal reflected light L3, which is the emitted light of the light-emitting element 6 reflected inside this device, and the ambient light L4 incident thereon, the number of second received-light pulses (the number of second internal output pulses) of the second light-receiving unit 2 in response to the ambient light L4 incident thereon, and the ratio between the light-emission period T1 and the non-light-emission period T2 of the light-emitting element 6, the number of second effective pulses (the number of third internal output pulses) which is the number of second received-light pulses of the second light-receiving unit 2 in response to the internal reflected light L3 incident thereon, and the distance computation unit 33 (the distance calculation unit) calculates the distance from this device to the object 50 based on the result of comparison between the reference pulses and the first received-light pulses of the first light-receiving unit 1 in the light-emission period T1 and the result of comparison between the reference pulses and the second received-light pulses of the second light-receiving unit 2 in the light-emission period T1 if the number of first effective pulses (the number of third output pulses) is greater than the first reference value and the number of second effective pulses (the number of third internal output pulses) is greater than a second reference value.

Hereinafter, the schematic configuration of the TOF sensor 100 will be described in detail.

Figure 2:
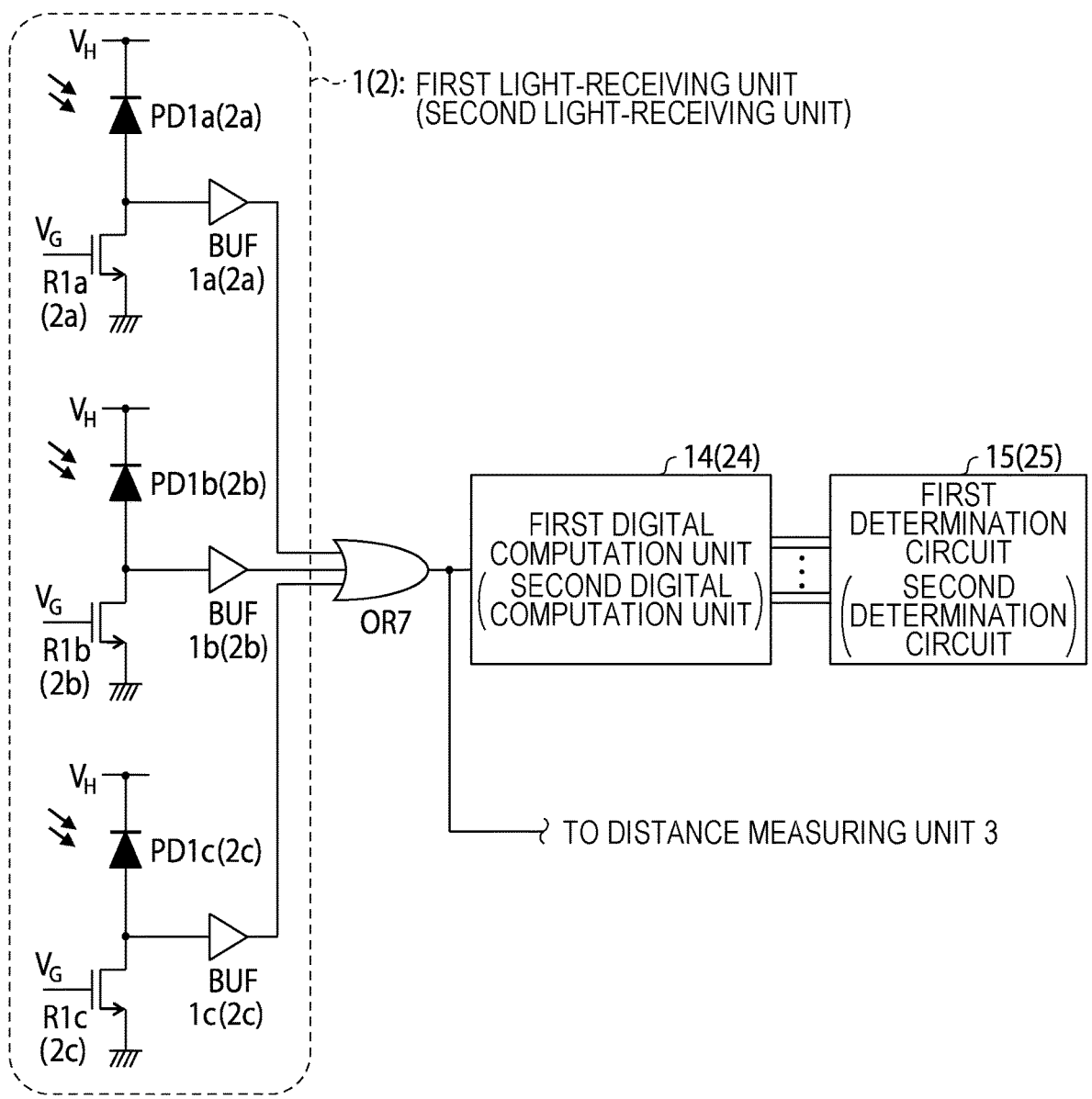
FIG. 2 is a block diagram depicting a configuration example of a light-receiving unit of the TOF sensor.

FIG. 1 is a block diagram depicting the schematic configuration of the TOF sensor 100 according to Embodiment 1 of the present invention. FIG. 2 is a block diagram depicting a configuration example of the first light-receiving unit 1 of the TOF sensor 100.

The TOF sensor 100 includes, as depicted in FIG. 1, the first light-receiving unit 1, the second light-receiving unit 2, a distance measuring unit 3, a reference pulse generation circuit 4, a driver circuit 5, the light-emitting element 6, the first digital computation unit 14, a first determination circuit 15, the second digital computation unit 24, and a second determination circuit 25.

The reference pulse generation circuit 4 generates the reference pulses. The reference pulse generation circuit 4 provides the driver circuit 5 with the reference pulses and provides a first time difference extracting unit 31 and a second time difference extracting unit 32, which will be described later, with the reference pulses as reference clocks.

The driver circuit 5 pulse-drives the light-emitting element 6 based on the reference pulses from the reference pulse generation circuit 4 and a light-emission period and a non-light-emission period which are determined by a control unit (not depicted in the drawing) which controls the constituent elements of the TOF sensor 100.

The light-emitting element 6 (the light-emitting unit) emits emitted light L1 toward the object 50 in accordance with the reference pulses in the light-emission period T1. The light-emitting element 6 does not emit light in the non-light-emission period T2.

Specifically, in a pulse acquisition period, the light-emitting element 6 has two states: a state α in which the light-emitting element 6 repeats pulse emission (emission of light toward the object 50) and a state β in which the light-emitting element 6 does not perform light emission (does not emit light). In other words, the period in which the light-emitting element 6 is in the state α is the light-emission period T1 and the period in which the light-emitting element 6 is in the state β is the non-light-emission period T2.

The first light-receiving unit 1 receives first incident light L10 including the reflected light L2, which is emitted from the light-emitting element 6 and reflected from the object 50, and the ambient light L4 in the light-emission period T1, receives the ambient light L4 in the non-light-emission period T2, and outputs the first received-light pulses. Moreover, the first light-receiving unit 1 outputs the first received-light pulses to the first digital computation unit 14 and the first time difference extracting unit 31.

The first light-receiving unit 1 is of the photon counting type that outputs a binary pulse in response to a photon incident thereon by the light including the reflected light L2 from the object 50 and the ambient light. Here, the light including the reflected light L2 and the ambient light is the reflected light L2, the reflected light inside a package (the internal reflected light L3), the ambient light, (the ambient light L4 and so forth), and is the first incident light L10 depicted in FIG. 1. Moreover, it is assumed that a pulse output by a carrier thermally generated in the first light-receiving unit 1 is also included in the first received-light pulses.

The first light-receiving unit 1 includes a photodiode PD1, an active quenching resistance R1 (a resistance component of a MOS transistor), and a buffer BUF1. The photodiode PD1 and the resistance R1 are connected in series. A bias voltage $V_H$ more than or equal to a breakdown voltage is applied to the photodiode PD1, and a reference voltage $V_G$ is applied to the resistance R1.

The photodiode PD1 is an avalanche photodiode in Geiger mode, and causes an avalanche phenomenon in response to a single photon incident thereon in the application of the bias voltage $V_H$ more than or equal to the breakdown voltage and causes a current to flow therethrough. As a result of the current flowing through the resistance R1 connected in series to the photodiode PD1, the inter-terminal voltage of the resistance R1 increases. With an increase in the inter-terminal voltage, the bias voltage of the photodiode PD1 decreases and the avalanche phenomenon ceases. When the current by the avalanche phenomenon ceases, the inter-terminal voltage of the resistance R1 decreases and the state returns to a state in which the bias voltage $V_H$ more than or equal to the breakdown voltage is applied to the photodiode PD1 again. By the buffer BUF1, a change in the voltage between the photodiode PD1 and the resistance R1 is extracted as a binary pulse output. This causes the first light-receiving unit 1 to receive the first incident light L10 and output the first received-light pulses.

The second light-receiving unit 2 is placed in the TOF sensor 100, receives light including the internal reflected light L3 and the ambient light L4 in the light-emission period T1, receives the ambient light L4 in the non-light-emission period T2, and outputs the second received-light pulses. Moreover, the second light-receiving unit 2 outputs the second received-light pulses to the second digital computation unit 24 and the second time difference extracting unit 32.

Specifically, the second light-receiving unit 2 is disposed near the light-emitting element 6 and is of the photon counting type that outputs a binary pulse in response to a photon incident thereon by the light including the internal reflected light L3 of the TOF sensor 100 and the ambient light L4. Here, the light including the internal reflected light L3 and the ambient light L4 is second incident light L20 depicted in FIG. 1.

The second light-receiving unit 2 includes a photodiode PD2, an active quenching resistance R2, and a buffer BUF2. The photodiode PD2, the active quenching resistance R2, and the buffer BUF2 have the same functions as the photodiode PD1, the active quenching resistance R1, and the buffer BUF1, respectively, of the first light-receiving unit 1. This causes the second light-receiving unit 2 to receive the second incident light L20 and output the second received-light pulses.

If there is more than one first light-receiving unit 1 that receives the first incident light L10 or more than one second light-receiving unit 2 that receives the second incident light L20, as depicted in FIG. 2, after the outputs (the outputs of a BUF1a(2a), a BUF1b(2b), and a BUF1c(2c)) from each light-receiving unit are ORed, the first received-light pulses or the second received-light pulses are output to the first digital computation unit 14 and the first time difference extracting unit 31 or the second digital computation unit 24 and the second time difference extracting unit 32.

The distance measuring unit 3 measures the distance between the TOF sensor 100 and the object 50. The distance measuring unit 3 includes the first time difference extracting unit 31, the second time difference extracting unit 32, and the distance computation unit 33. Each constituent element of the distance measuring unit 3 will be described later in detail.

(Acquiring the Required Number of Pieces of Valid Data by Acquiring Effective Pulses Whose Number is Greater than or Equal to a Reference Value)

To maintain the high distance measurement accuracy of the TOF sensor 100, it is necessary to obtain the distance by computations after acquiring a given number of pieces of valid data that is used for computations of distance measurement.

The valid data in the first received-light pulses is the first received-light pulse that is output when the reflected light L2 and the internal reflected light L3 are received. Hereafter, the valid data in the first received-light pulses is referred to as a first effective pulse. The valid data in the second received-light pulses is the second received-light pulse that is output when the internal reflected light L3 is received. Hereafter, the valid data in the second received-light pulses is referred to as a second effective pulse.

By acquiring the first effective pulses whose number is greater than or equal to a reference value and the second effective pulses whose number is greater than or equal to a reference value, the required number of pieces of valid data is secured.

(Acquiring the Required Number of First Effective Pulses)

Processing to acquire the required number of first effective pulses will be described below based on FIGS. 1 and 3.

Acquiring the first effective pulses whose number is greater than or equal to the reference value is performed by the first digital computation unit 14 and the first determination circuit 15. The first digital computation unit 14 and the first determination circuit 15 are connected by the number of wires corresponding to the number of bits.

The control unit (not depicted in the drawing), which controls the constituent components of the TOF sensor 100, sets the light-emission period T1 and the non-light-emission period T2 of the light-emitting element 6 at a predetermined time ratio (a predetermined ratio) in a predetermined period, and the first digital computation unit 14 acquires (counts) the number of first output pulses, which is the number of first received-light pulses in the light-emission period T1, and the number of second output pulses, which is the number of first received-light pulses output from the first light-receiving unit 1 in the non-light-emission period T2, and obtains the number of first effective pulses, which is the number of first received-light pulses at the time of reception of the reflected light L2 and the internal reflected light L3, by computations based on the number of first output pulses, the number of second output pulses, and the predetermined time ratio. The first digital computation unit 14 outputs the digital value of the number of first effective pulses obtained by computations to the first determination circuit 15.

(Setting of the Light-Emission Period T1 and the Non-Light-Emission Period T2 by the First Digital Computation Unit)

Based on FIG. 3, setting of the light-emission period T1 and the non-light-emission period T2 by the control unit (not depicted in the drawing) which controls the constituent elements of the TOF sensor 100 will be described. (a) to (c) of FIG. 3 are diagrams for explaining an operation of the TOF sensor 100 in the pulse acquisition period. (b) of FIG. 3 depicts output pulses from the first light-receiving unit 1 in one cycle, and (a) of FIG. 3 is a partially enlarged view of (b) of FIG. 3. (c) of FIG. 3 is a diagram depicting the pulse acquisition period. It is to be noted that the second light-receiving unit 2 also operates in a manner similar to the first light-receiving unit 1 in the pulse acquisition period.

The light-emission period T1 and the non-light-emission period T2 of the light-emitting element 6 are determined by the control unit (not depicted in the drawing) which controls the constituent elements of the TOF sensor 100. Specifically, as depicted in (b) of FIG. 3, the light-emission period T1 (a period of time in which the light-emitting element 6 is in the state α) and the non-light-emission period T2 (a period in which the light-emitting element 6 is in the state β) are set so that the light-emission period T1>the non-light-emission period T2. Moreover, in the TOF sensor 100, as depicted in (c) of FIG. 3, in the pulse acquisition period, an operation is repeated with periods which are performed at a fixed time ratio (the light-emission period T1:the non-light-emission period T2=$t_1$:$t_2$) being set as one cycle. It is desirable to set one cycle as short as possible without allowing an environment of the state α and the state β to change. Moreover, if the non-light-emission period T2 is too short, an error which is caused at the time of calculation of the number of pieces of valid data becomes large; therefore, it is desirable that the length of the non-light-emission period T2 is set so that the ratio between the light-emission period T1 and the non-light-emission period T2 is about 10:1.

(Obtaining the Number of First Effective Pulses by Computations by the First Digital Computation Unit)

As described earlier, the first received-light pulses which are output from the first light-receiving unit 1 include not only the first effective pulses which are generated by the reflected light L2 and the internal reflected light L3, but also noise pulses which are generated by the ambient light L4.

Figure 3:
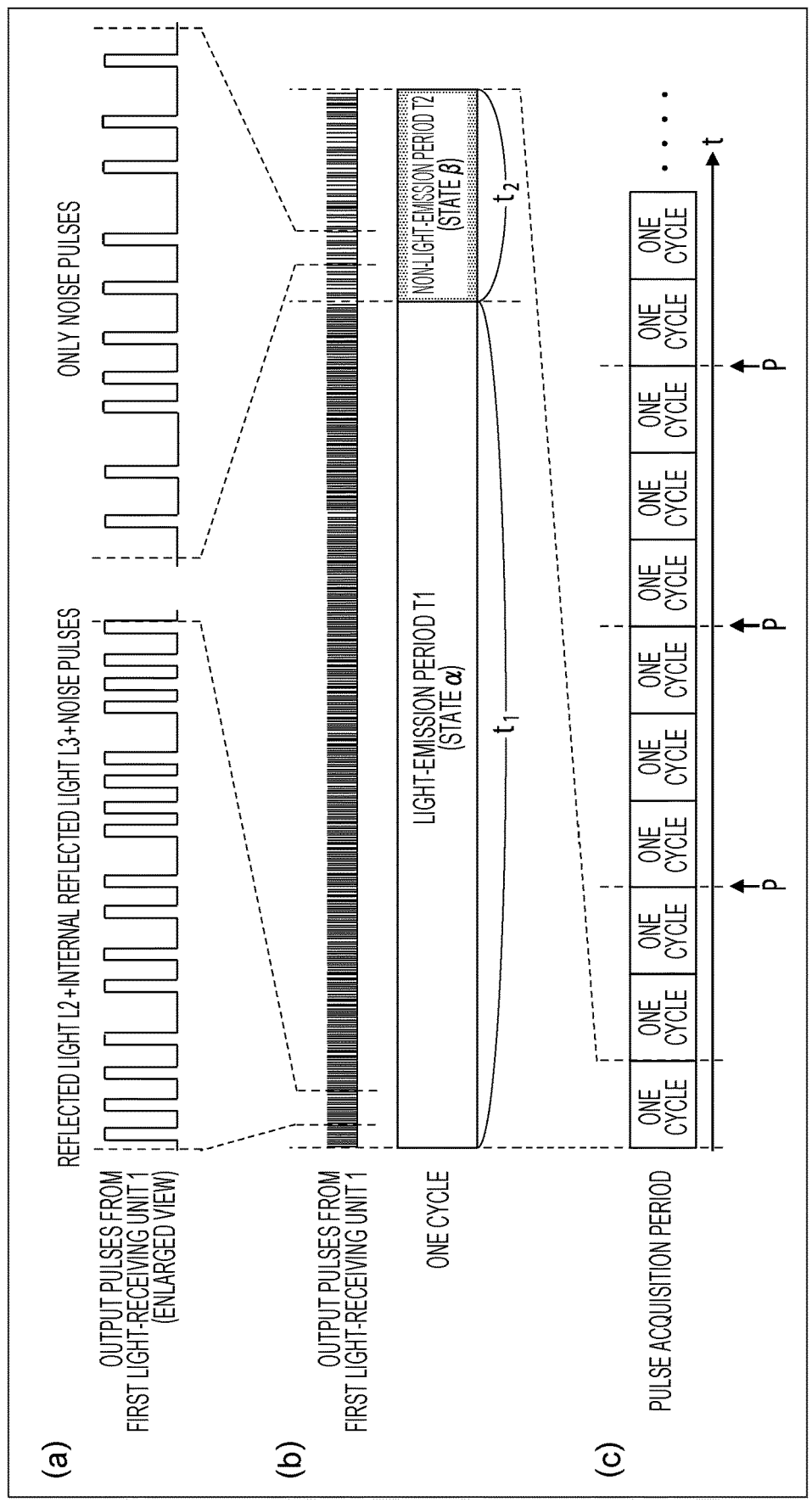
FIGS. 3 (a) to (c) are diagrams for explaining an operation of the TOF sensor in a pulse acquisition period.

Specifically, as depicted in (a) of FIG. 3, in the light-emission period T1, pulses including the first effective pulses by the reflected light L2 and the internal reflected light L3 and the noise pulses by the ambient light L4 are output from the first light-receiving unit 1 as the first received-light pulses. Moreover, in the non-light-emission period T2, only the noise pulses are output from the first light-receiving unit 1 as the first received-light pulses.

Thus, the first digital computation unit 14 obtains the number of first effective pulses in one cycle by computations in the following manner. That is, the first digital computation unit 14 subtracts, from the number of first output pulses C1 acquired in the light-emission period T1, a value obtained by multiplying the number of second output pulses C2 acquired in the non-light-emission period T2 by the coefficient of the predetermined time ratio (the light-emission period T1/the non-light-emission period T2=$t_1$/$t_2$). In other words, in the first digital computation unit 14, the number of first effective pulses at the end of one cycle is obtained by $$C1 - C2 \times (t_1/t_2) \quad (1).$$

For a change in an external environment such as the ambient light, the light-emission period T1 and the non-light-emission period T2 are continuously performed in a short time of one cycle. The second term of Formula 1 derives how many noise pulses were generated in the light-emission period T1. By subtracting, from the number of first output pulses C1, a value obtained by multiplying the number of second output pulses C2 by the coefficient of the predetermined time ratio, it is possible to obtain only the number of first effective pulses by the reflected light L2 and the internal reflected light L3 in the light-emission period T1.

Moreover, it is desirable to make settings so that $t_1$ (the light-emission period T1)>$t_2$ (the non-light-emission period T2). By so doing, the ratio of the light-emission period T1, in which the light-emitting element 6 repeats pulse emission, in one cycle can be increased, which makes it possible to accelerate the acquisition of the first effective pulses and reduce loss of time by the non-light-emission period T2 in which only the noise pulses are generated.

Moreover, the first effective pulses at the end of n cycle (at the end of n period) are obtained by computations by Formula 2 below.

[Math. 1]

$$\sum_{k=1}^{n} \{C1\_k - C2\_k(t_1/t_2)\} \quad (2)$$

Here, $C1\_k$ denotes the number of first output pulses acquired in the light-emission period T1 in the k-th cycle, and $C2\_k$ denotes the number of second output pulses acquired in the non-light-emission period T2 in the k-th cycle. That is, as a result of only the number of first effective pulses being added by the first digital computation unit 14, the first effective pulses at the end of n cycle are obtained by computations.

With every end of n cycle (n≥1), the first digital computation unit 14 converts the number of first effective pulses acquired by computations into a digital value and outputs the digital value to the first determination circuit 15.

(Determination of the Number of First Effective Pulses)

The first determination circuit 15 (a third output pulse number determination unit) determines whether or not the number of first effective pulses output from the first digital computation unit 14 is greater than the first reference value. It is desirable that the first reference value is set at the number of pieces of first valid data required to secure sufficient measurement accuracy to obtain the distance to an object.

With every end of n cycle (n≥1), the first determination circuit 15 determines whether or not the digital value output from the first digital computation unit 14 is greater than the first reference value. It is possible to set n at any value, and, in (c) of FIG. 3, a case where n=3 is depicted. In this case, at each point P (every three cycles), the first determination circuit 15 determines whether or not the number of first effective pulses output from the first digital computation unit 14 is greater than the first reference value.

If the number of first effective pulses output from the first digital computation unit 14 is smaller than or equal to the first reference value, the first determination circuit 15 continues the pulse acquisition period and the first digital computation unit 14 continues the acquisition of the first received-light pulses. If the number of first effective pulses output from the first digital computation unit 14 is greater than the first reference value, the first determination circuit 15 ends the pulse acquisition period and outputs the determination result to the first time difference extracting unit 31 and the distance computation unit 33.

(Acquiring the Required Number of Second Effective Pulses)

Processing to acquire the required number of second effective pulses will be described below based on FIGS. 1 and 3.

Acquiring the second effective pulses whose number is greater than or equal to the reference value is performed by the second digital computation unit 24 and the second determination circuit 25. The second digital computation unit 24 and the second determination circuit 25 are connected by the number of wires corresponding to the number of bits.

The second digital computation unit 24 acquires the number of first internal output pulses, which is the number of second received-light pulses in the light-emission period T1, and the number of second internal output pulses, which is the number of second received-light pulses in the non-light-emission period T2, and obtains the number of second effective pulses, which is the number of second received-light pulses at the time of reception of the internal reflected light L3, by computations based on the number of first internal output pulses, the number of second internal output pulses, and the predetermined time ratio. The second digital computation unit 24 outputs the digital value of the number of second effective pulses obtained by computations to the second determination circuit 25.

(Obtaining the Number of Second Effective Pulses by Computations by the Second Digital Computation Unit)

As described earlier, the second received-light pulses from the second light-receiving unit 2 include not only the second effective pulses which are generated by the internal reflected light L3, but also the noise pulses which are generated by the ambient light L4.

Specifically, in the light-emission period T1, pulses including the second effective pulses by the internal reflected light L3 and the noise pulses by the ambient light L4 are output from the second light-receiving unit 2 as the second received-light pulses. Moreover, in the non-light-emission period T2, only the noise pulses are output from the second light-receiving unit 2 as the second received-light pulses.

Thus, the second digital computation unit 24 obtains the number of second effective pulses in one cycle by computations in the following manner. That is, the second digital computation unit 24 subtracts, from the number of first internal output pulses D1 acquired in the light-emission period T1, a value obtained by multiplying the number of second internal output pulses D2 acquired in the non-light-emission period T2 by the coefficient of the light-emission period T1/the non-light-emission period T2 ($t_1/t_2$). In other words, by the second digital computation unit 24, the number of second effective pulses at the end of one cycle is obtained by $$D1 - D2 \times (t_1/t_2) \tag{3}.$$

The second term of Formula 3 derives how many noise pulses were generated in the light-emission period T1. By subtracting, from the number of first internal output pulses D1, a value obtained by multiplying the number of second internal output pulses D2 by the coefficient of the predetermined time ratio, it is possible to obtain only the number of second effective pulses by the internal reflected light L3 in the light-emission period T1.

Moreover, the first effective pulses at the end of n cycle are obtained by computations by Formula 4 below.

[Math. 2]

$$\sum_{k=1}^{n} \{D1\_k - D2\_k(t_1/t_2)\} \tag{4}$$

Here, $D1\_k$ denotes the number of first internal output pulses acquired in the light-emission period in the k-th cycle, and $D2\_k$ denotes the number of second internal output pulses acquired in the non-light-emission period in the k-th cycle. That is, as a result of only the number of second effective pulses being added by the second digital computation unit 24, the second effective pulses at the end of n cycle are obtained by computations.

With every end of n cycle (n≥1), the second digital computation unit 24 converts the number of second effective pulses acquired by computations into a digital value and outputs the digital value to the second determination circuit 25.

(Determination of the Number of Second Effective Pulses)

The second determination circuit 25 determines whether or not the number of second effective pulses output from the second digital computation unit 24 is greater than the second reference value. The second reference value may be the same as the first reference value.

With every end of n cycle (n≥1), the second determination circuit 25 determines whether or not the digital value output from the second digital computation unit 24 is greater than the second reference value. If the number of second effective pulses output from the second digital computation unit 24 is smaller than or equal to the second reference value, the second determination circuit 25 continues the pulse acquisition period and the second digital computation unit 24 continues the acquisition of the second received-light pulses. If the number of second effective pulses output from the second digital computation unit 24 is greater than the second reference value, the second determination circuit 25 ends the pulse acquisition period and outputs the determination result to the second time difference extracting unit 32 and the distance computation unit 33.

(Series of Operations which is Performed by the Time of Distance Measurement)

The first time difference extracting unit 31 extracts a first average time difference which is the average time difference between the first received-light pulses and the reference pulses in the light-emission period T1.

Specifically, the first time difference extracting unit 31 acquires the first received-light pulses in the light-emission period T1 until the first determination circuit 15 determines that the number of first effective pulses is greater than the first reference value, and obtains the first average time difference of the acquired first received-light pulses. The first average time difference is the average of the times from when the light-emitting element 6 emits light (from the reference pulse) till when the first light-receiving unit 1 receives the light and outputs the first received-light pulse. In the first time difference extracting unit 31, all the data of the first received-light pulses in the light-emission period T1 is averaged until the number of first effective pulses becomes greater than the first reference value. When the first determination circuit 15 determines that the number of first effective pulses is greater than the first reference value, the first time difference extracting unit 31 outputs the first average time difference to the distance computation unit 33.

The second time difference extracting unit 32 extracts a second average time difference which is the average time difference between the second received-light pulses and the reference pulses in the light-emission period T1.

Specifically, the second time difference extracting unit 32 acquires the second received-light pulses in the light-emission period T1 until the second determination circuit 25 determines that the number of second effective pulses is greater than the second reference value, and obtains the second average time difference of the acquired second received-light pulses. The second average time difference is the average of the times from when the light-emitting element 6 emits light (from the reference pulse) till when the second light-receiving unit 2 receives the light and outputs the second received-light pulse. In the second time difference extracting unit 32, all the data of the second received-light pulses in the light-emission period T1 is averaged until the number of second effective pulses becomes greater than the second reference value. When the second determination circuit 25 determines that the number of second effective pulses is greater than the second reference value, the second time difference extracting unit 32 outputs the second average time difference to the distance computation unit 33.

When the first determination circuit 15 determines that the number of first effective pulses is greater than the first reference value and the second determination circuit 25 determines that the number of second effective pulses is greater than the second reference value, the distance computation unit 33 obtains the distance to the object 50 by computations based on the first average time difference and the second average time difference.

When, for example, the internal reflected light L3 is sufficiently stronger than the reflected light L2, a determination by the first determination circuit 15 that the number of first effective pulses is greater than the first reference value is definitely made later than a determination by the second determination circuit 25 that the number of second effective pulses is greater than the second reference value. In such a case, when the number of first effective pulses is greater than the first reference value, the distance computation unit 33 may obtain the distance to the object 50 by computations based on the first average time difference and the second average time difference.

Since the second light-receiving unit 2 is placed near the light-emitting element 6, it can be regarded that the distance of the second received-light pulse, which is output from the second light-receiving unit 2, on a spatial route is almost 0. Thus, it can be regarded that a difference between the first average time difference and the second average time difference is a time difference between light arrival times caused by the distance (the round-trip distance from the TOF sensor 100 to the object 50) on a spatial route. The distance computation unit 33 extracts a time difference corresponding to the distance on a spatial route by using the first average time difference and the second average time difference and obtains by computations the distance to an object from which light is reflected.

In the existing TOF sensor, a time in which valid data is acquired is set with a plenty of margin for time left so that necessary valid data can be acquired.

By contrast, in the TOF sensor 100 according to the present embodiment, the number of first effective pulses which are the valid data and the number of second effective pulses which are the valid data are counted and a determination as to when the required number of pieces of valid data could be acquired is made. By so doing, as soon as the number of pieces of valid data required to maintain high measurement accuracy can be acquired, it is possible to obtain the distance to the object 50 by computations. As a result, the distance measurement time can be minimized, which makes it possible to perform highly accurate distance measurement in a short time.

Moreover, the TOF sensor 100 may include the control unit (not depicted in the drawing) which controls the constituent elements of the TOF sensor 100, and the control unit may receive the determination results of the first determination circuit 15 and the second determination circuit 25 and provide an instruction to the distance measuring unit 3 to perform distance measurement.

(Specific Circuit Configuration of the First Digital Computation Unit)

Figure 4:
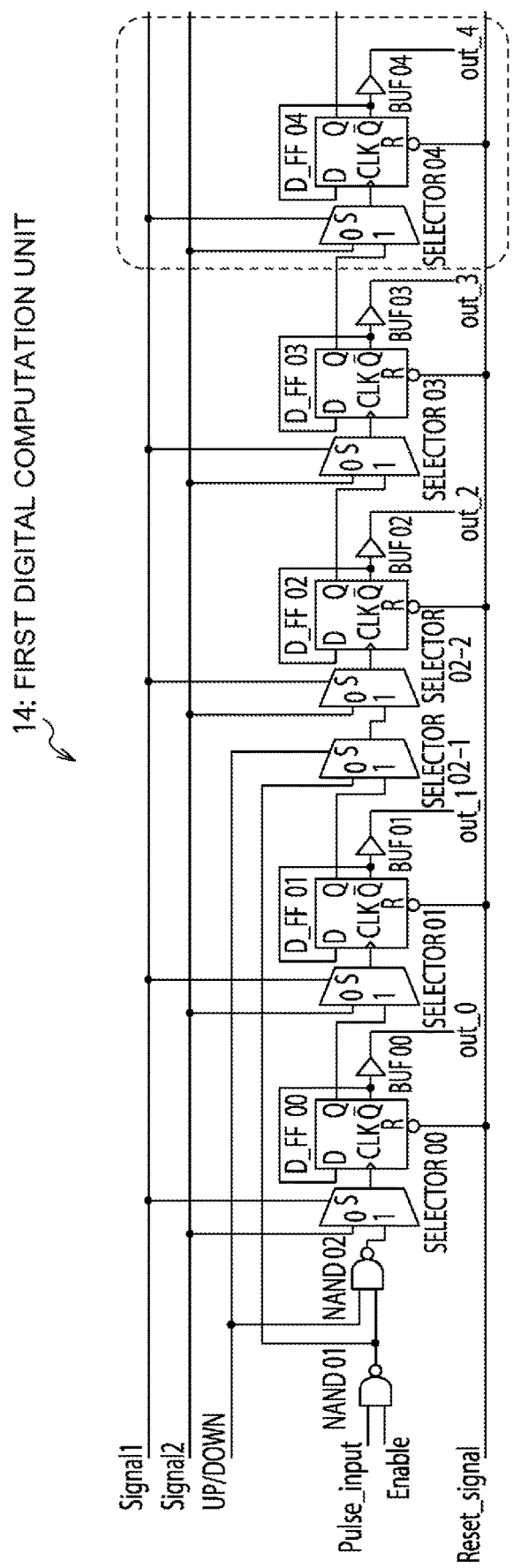
FIG. 4 is a circuit diagram depicting a configuration example of a digital computation unit of the TOF sensor.
Figure 5:
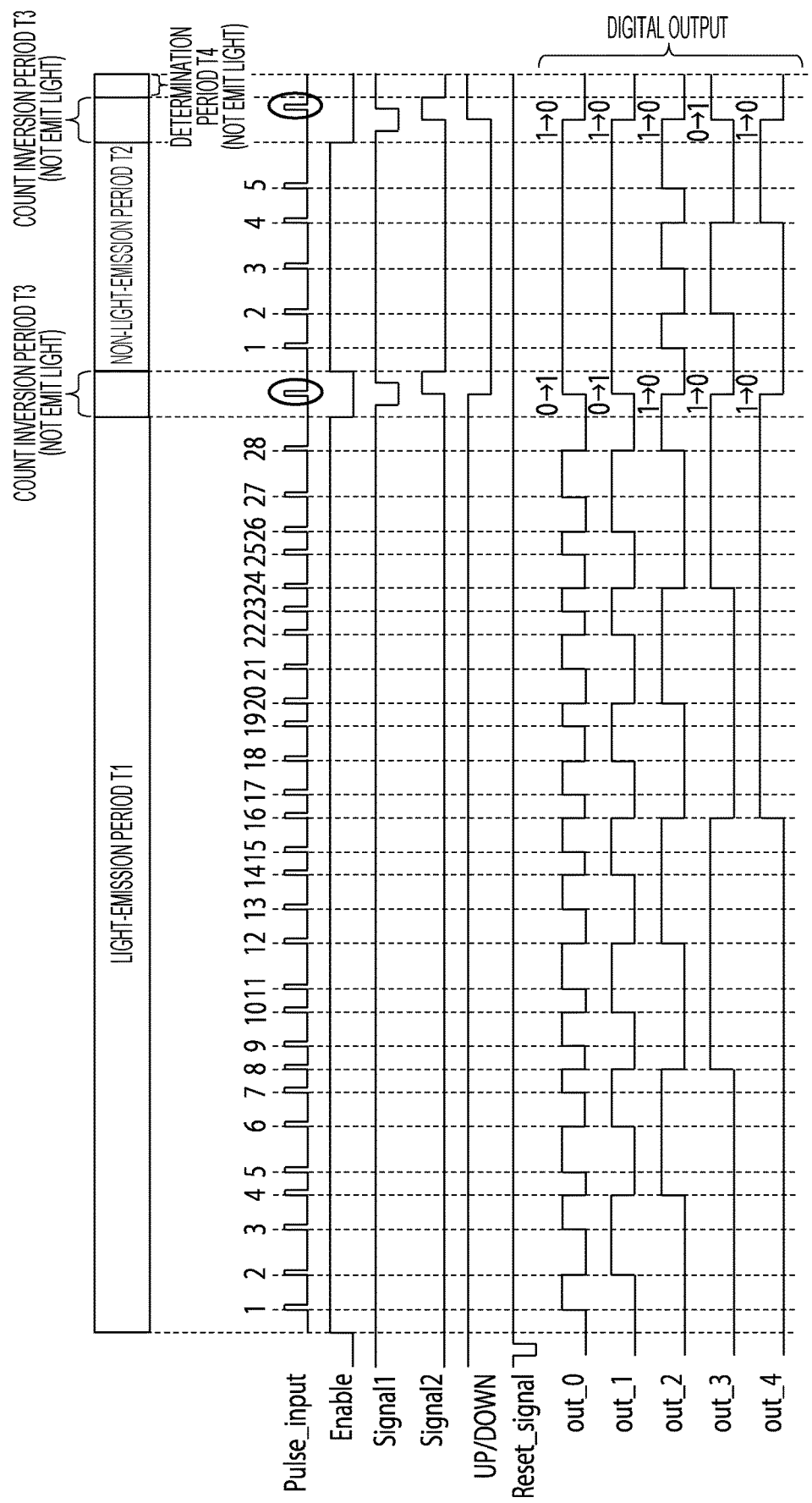
FIG. 5 is a diagram for explaining an operation of the digital computation unit.
Figure 6:
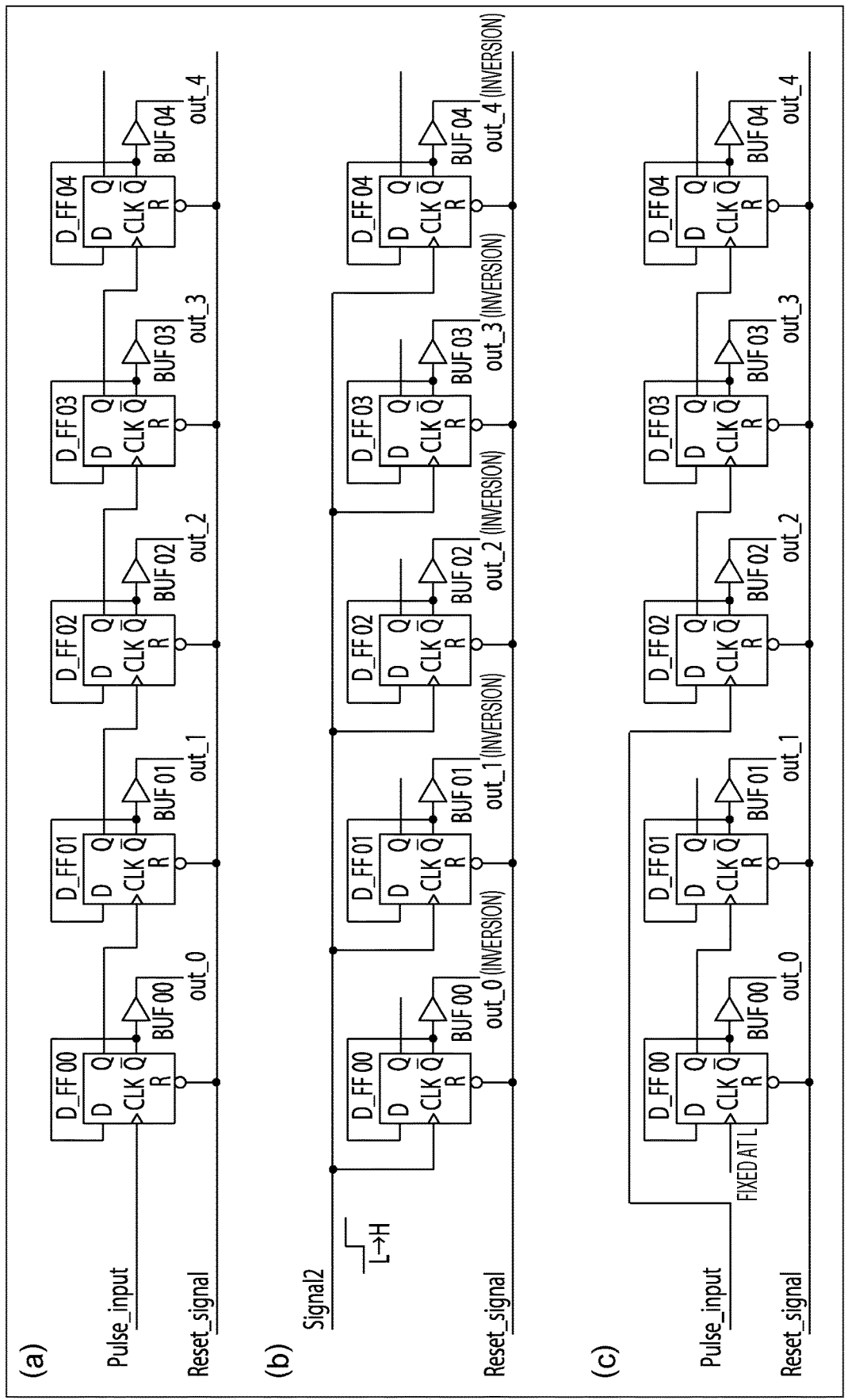
FIGS. 6 (a) to (c) are circuit diagrams for explaining an operation of the digital computation unit in each period.

A specific circuit configuration example of the first digital computation unit 14 will be described below based on FIGS. 4 to 6. FIG. 4 is a circuit diagram depicting a configuration example of the first digital computation unit 14 of the TOF sensor 100. FIG. 5 is a diagram for explaining an operation of the first digital computation unit 14. (a) to (c) of FIG. 6 are circuit diagrams for explaining an operation of the first digital computation unit 14 in each period, and (a) of FIG. 6 is a circuit diagram for explaining an operation of the first digital computation unit 14 in the light-emission period T1. (b) of FIG. 6 is a circuit diagram for explaining an operation of the first digital computation unit 14 in a count inversion period T3. (c) of FIG. 6 is a circuit diagram for explaining an operation of the first digital computation unit 14 in the non-light-emission period T2. It is to be noted that the second digital computation unit 24 also operates in a manner similar to the operation of the first digital computation unit 14, which will be described below.

Moreover, the following description deals with a case where the ratio between the light-emission period T1 and the non-light-emission period T2 is 4:1 and the number of bits which connect to the first determination circuit 15 is 5 bits.

It is to be noted that input of a High (hereinafter referred to as H) or Low (hereinafter referred to as L) signal to Enable, Signal1, Signal2, and UP/DOWN is performed by, for example, the control unit (not depicted in the drawing) which controls the constituent elements of the TOF sensor 100.

As depicted in FIGS. 4 and 5, the first digital computation unit 14 is a circuit that counts the number of pulses input from a Pulse_input terminal during the Enable terminal is H period. It is to be noted that the number of bits can be increased by connecting another circuit portion surrounded with a dashed line in FIG. 4.

As a result of H→L→H signals being input to a Reset_signal terminal before the acquisition of pulses, digital computation outputs 5 bits (OUT_0, OUT_1, OUT_2, OUT_3, OUT_4) are reset to 0 (=L) and pulse acquisition is started.

In the light-emission period T1, as depicted in FIG. 5 and (a) of FIG. 6, Enable=H, Signal1=H, Signal2=L, and UP/DOWN=H, and a circuit configuration in which the number of pulses input from the Pulse_input terminal is added is obtained.

Between the light-emission period T1 and the non-light-emission period T2, the short count inversion period T3 is provided. In the count inversion period T3, Signal1, Signal2, and UP/DOWN are changed. The count inversion period T3 is sufficiently shorter than the light-emission period T1 and the non-light-emission period T2 and is, for instance, about 1/1000 of the light-emission period T1 or the non-light-emission period T2.

In the count inversion period T3, Enable=L is input and a pulse (a circled portion in FIG. 5) which is input from the Pulse_input terminal is not counted. Moreover, in the count inversion period T3, the light-emitting element 6 does not emit light. As depicted in (b) of FIG. 6, in the count inversion period T3, D flip-flops D_FF between the bits are separated from each other and all the bits are inverted when Signal2=L is changed to H.

In the non-light-emission period T2, as depicted in FIG. 5, Enable=H, Signal1=H, Signal2=L, and UP/DOWN=L and the first digital computation unit 14 does subtraction of the number of pulses input from the Pulse_input terminal. As depicted in (c) of FIG. 6, the circuit configuration is similar to that of (a) of FIG. 6 except that input is performed from the third bit (OUT_2) and the first bit and the second bit (OUT_0, OUT_1) are not changed, and the operation itself adds the number of pulses from the third bit.

Specific computation procedures will be described. As depicted in FIG. 5, when a case where 28 first received-light pulses are input in the light-emission period T1 and 5 first received-light pulses are input in the non-light-emission period T2 is taken up as an example, the procedures are as follows. It is to be noted that the following description deals with the order of OUT_4, OUT_3, OUT_2, OUT_1, and OUT_0 and a case where an H voltage is 1 and an L voltage is 0.

The number of first received-light pulses in the light-emission period T1 is 28 (a decimal number), which is represented as 11100 in binary. Moreover, this is represented as 00011 in the count inversion period T3 because each bit is inverted.

Since the number of first received-light pulses in the non-light-emission period T2 is 5 (a decimal number), 5 is added by shifting 00011 in a higher-order bit direction by 2 bits. That is, since 000(0) in a higher-order 3-bit portion changes to 101(5), 00011 turns into 10111. Moreover, since each bit is inverted in the count inversion period T3, 10111 turns into 01000 (a binary number), which represents 8 in decimal.

As described above, the first digital computation unit 14 performs computations: (the number of first output pulses C1)−(the number of second output pulses C2)×(the light-emission period T1($t_1$)/the non-light-emission period T2($t_2$))=28−5×4=8.

Addition at the time of bit inversion in the non-light-emission period T2 is equivalent to doing subtraction if the bit is restored to the original. Moreover, performing pulse input and addition by shifting bits in a higher-order bit direction by i bit (i is a variable) is equivalent to a state in which an addition value is multiplied by 2 raised to the i-th power.

In the present embodiment, since $t_1/t_2$ is four times, addition is performed by shifting bits by 2 bits in the non-light-emission period T2. Therefore, in terms of the circuit configuration of the first digital computation unit 14, it is easy to multiply an addition value by a power of 2, in other words, make the light-emission period T1 equal to the non-light-emission period T2 multiplied by a power of 2, which makes it possible to simplify the configuration of the digital computation circuit and reduce a circuit size.

After the non-light-emission period T2, a determination period T4 starts with another count inversion period T3 being placed therebetween.

Modified Example 1

Figure 7:
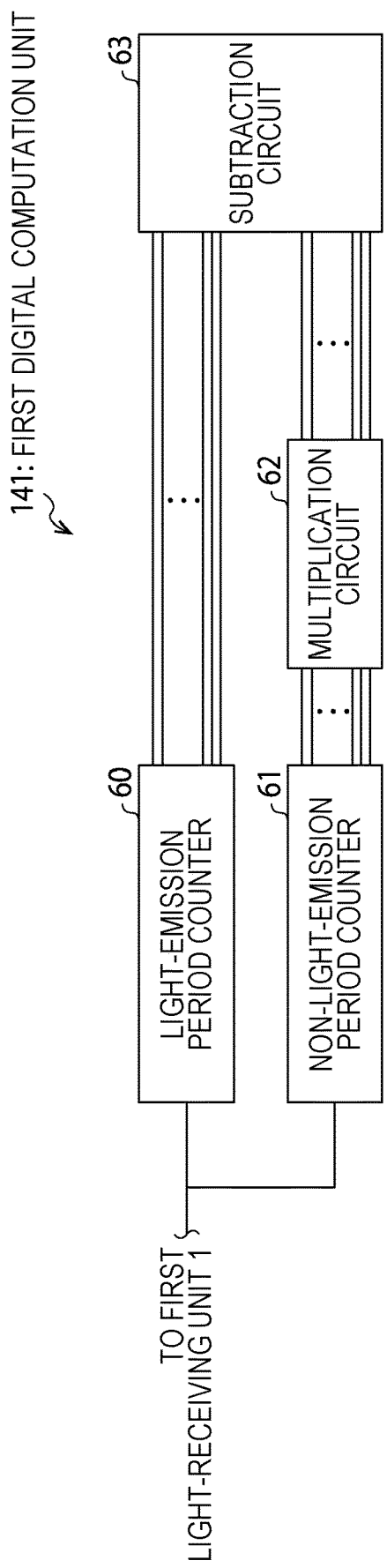
FIG. 7 is a block diagram depicting a modified example of the configuration of the digital computation unit of the TOF sensor.

A first digital computation unit 141 which is a modified example of the schematic configuration of the first digital computation unit 14 will be described below based on FIG. 7. FIG. 7 is a block diagram depicting the modified example of the configuration of the first digital computation unit 14 of the TOF sensor 100. It is to be noted that the circuit of the second digital computation unit 24 can also form a modified example similar to that of the first digital computation unit 14.

As depicted in FIG. 7, the first digital computation unit 141 may separately include a light-emission period counter 60 that counts the number of first output pulses, a non-light-emission period counter 61 that counts the number of second output pulses, a multiplication circuit 62 that performs multiplication processing, and a subtraction circuit 63 that performs subtraction processing. The light-emission period counter 60 and the subtraction circuit 63 are connected by the number of wires corresponding to the number of bits, the non-light-emission period counter 61 and the multiplication circuit 62 are connected by the number of wires corresponding to the number of bits, and the multiplication circuit 62 and the subtraction circuit 63 are connected by the number of wires corresponding to the number of bits.

Since the number of D flip-flops D_FF of the first digital computation unit 141 is greater than that of the configuration of the first digital computation unit 14, a circuit size is increased.

Also in the first digital computation unit 141, in one cycle, the light-emission period T1 is equal to the non-light-emission period T2 multiplied by 2 raised to the i-th power, which makes it possible to reduce a circuit size. The reason is as follows. When subtraction processing is performed in the first digital computation unit 141, it is possible perform computations of C1−C2×($t_1/t_2$) by doing subtraction by shifting a binary output of the number of second output pulses C2 in a higher-order bit direction by i bit (i is a variable), which eliminates the need to provide the multiplication circuit 62 that performs a multiplication by the coefficient of $t_1/t_2$.

Moreover, in the present embodiment, even by adopting a configuration which does not include the second light-receiving unit 2 and includes only the first light-receiving unit 1, it is possible to perform measurement of the distance to the object 50. In that case, the distance computation unit 33 obtains the distance to an object by computations based on the first received-light pulses and the reference pulses in the light-emission period T1.

Moreover, by providing the TOF sensor 100 with the second light-receiving unit 2 having the same circuit as the first light-receiving unit 1, it is possible to calculate the distance to the object 50 only by a pure distance difference in an optical path for the following reasons (1) and (2), which makes it possible to increase distance calculation accuracy. (1) Consideration can be given to a delay in the circuit and (2) consideration can be given to a delay in light emission of the light-emitting element and a delay in a response of the photodiode.

Embodiment 2

Figure 8:
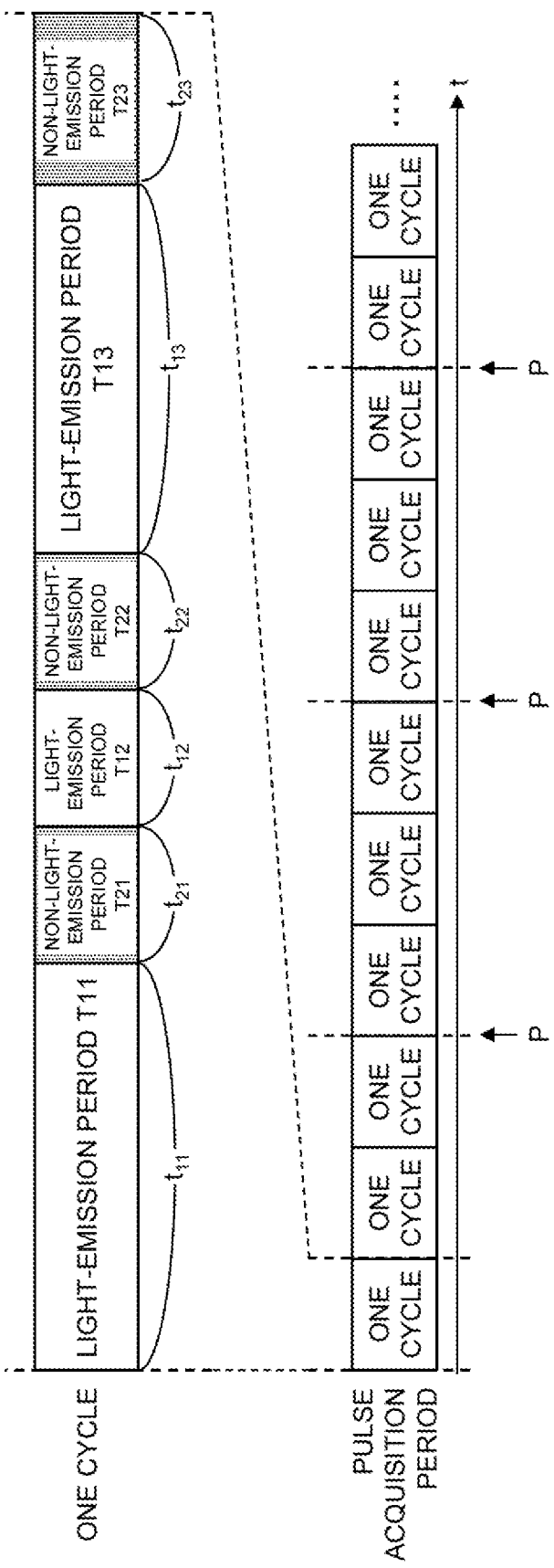
FIG. 8 is a diagram for explaining an operation of a TOF sensor according to Embodiment 2 of the present invention in the pulse acquisition period.

Embodiment 2 of the present invention will be described with reference to FIGS. 1 and 8. FIG. 8 is a diagram for explaining an operation of a TOF sensor 100A according to Embodiment 2 of the present invention in the pulse acquisition period. The TOF sensor 100A differs from the TOF sensor 100 in that the TOF sensor 100A divides the light-emission period T1 and the non-light-emission period T2 and performs the periods in one cycle, and the other configuration is similar to that of the TOF sensor 100.

(Dividing the Light-Emission Period and the Non-Light-Emission Period and Performing the Periods in One Cycle)

In the present embodiment, as depicted in FIG. 8, the light-emission period T1 and the non-light-emission period T2 are divided and alternately performed. Specifically, the light-emission period T1 is divided into a light-emission period T11, a light-emission period T12, and a light-emission period T13 in one cycle, the non-light-emission period T2 is divided into a non-light-emission period T21, a non-light-emission period T22, and a non-light-emission period T23 in one cycle, and the light-emission periods and the non-light-emission periods are alternately performed.

The sum (the light-emission period T1) of the light-emission periods and the sum (the non-light-emission period T2) of the non-light-emission periods have the following relationship. That is, the sum of the light-emission periods (=the light-emission period T11+the light-emission period T12+the light-emission period T13)>the sum of the non-light-emission periods (=the non-light-emission period T21+the non-light-emission period T22+the non-light-emission period T23). In other words, $t_1$ ($=t_{11}+t_{12}+t_{13}$)>$t_2$ ($=t_{21}+t_{22}+t_{23}$) holds. Moreover, the ratio between $t_1$ and $t_2$ in one cycle is determined by a predetermined time ratio. By using, as one cycle, a period formed of the light-emission periods and the non-light-emission periods set in this manner, the TOF sensor 100A repeats an operation in the pulse acquisition period.

(Obtaining the Number of Effective Pulses by Computations)

As in the case of Embodiment 1, the first digital computation unit 14 adds the number of first output pulses C1 acquired in the light-emission period T1 and subtracts a value obtained by multiplying the number of second output pulses C2 acquired in the non-light-emission period T2 by the coefficient of (the total time ($t_1$) of the light-emission periods/the total time ($t_2$) of the non-light-emission periods) in one cycle. A digital value which is output from the digital computation unit at the end of one cycle is obtained by $$C1 - C2 \times (t_1/t_2) \tag{5}$$

For a change in an external environment such as the ambient light, the light-emission periods T11, T12, and T13 and the non-light-emission periods T21, T22, and T23 are continuously performed in a short time of one cycle. The second term of Formula 5 derives how many noise pulses were generated in the light-emission period T1. By subtracting, from the number of first output pulses C1, a value obtained by multiplying the number of second output pulses C2 by the coefficient of the predetermined time ratio, it is possible to obtain only the number of first effective pulses by the reflected light L2 and the internal reflected light L3 in the light-emission period T1.

Moreover, by making settings so that $t_1$ (the sum of the light-emission periods)>$t_2$ (the sum of the non-light-emission periods), it is possible to increase the ratio of the light-emission period, in which the light-emitting element 6 repeats pulse emission, in one cycle, accelerate the acquisition of the first effective pulses, and reduce loss of time by the non-light-emission period in which only the noise pulses are generated.

The first effective pulses at the end of n cycle are obtained by computations by Formula 6 given below.

[Math. 3]

$$\sum_{k=1}^{n} \{C1\_k - C2\_k(t_1/t_2)\} \tag{6}$$

Here, $C1\_k$ denotes the number of first output pulses acquired in the light-emission period in the k-th cycle, and $C2\_k$ denotes the number of second output pulses acquired in the non-light-emission period in the k-th cycle. That is, as a result of only the number of first effective pulses being added by the first digital computation unit 14, the first effective pulses at the end of n cycle are obtained by computations.

With every end of n cycle (n≥1), the first determination circuit 15 determines whether or not the number of first effective pulses which is output from the first digital computation unit 14 exceeds the first reference value. If the number of first effective pulses output from the first digital computation unit 14 is smaller than or equal to the first reference value, the first determination circuit 15 continues the pulse acquisition period and the first digital computation unit 14 continues the acquisition of the first received-light pulses. If the number of first effective pulses output from the first digital computation unit 14 is greater than the first reference value, the first determination circuit 15 ends the pulse acquisition period and outputs the determination result to the first time difference extracting unit 31 and the distance computation unit 33.

As in the case of Embodiment 1, with every end of n cycle (n≥1), it is possible to know the number of first effective pulses of the TOF sensor 100A and, upon acquisition of the necessary and sufficient number of pieces of data, obtain the distance to the object 50 by computations. As a result, the distance measurement time can be minimized, which makes it possible to perform highly accurate distance measurement in a short time.

Moreover, in the present embodiment, the second digital computation unit 24 and the second determination circuit 25 also perform processing similar to that of Embodiment 1 by using the light-emission period T1 and the non-light-emission period T2 which are set in the present embodiment.

Embodiment 3

Figure 9:
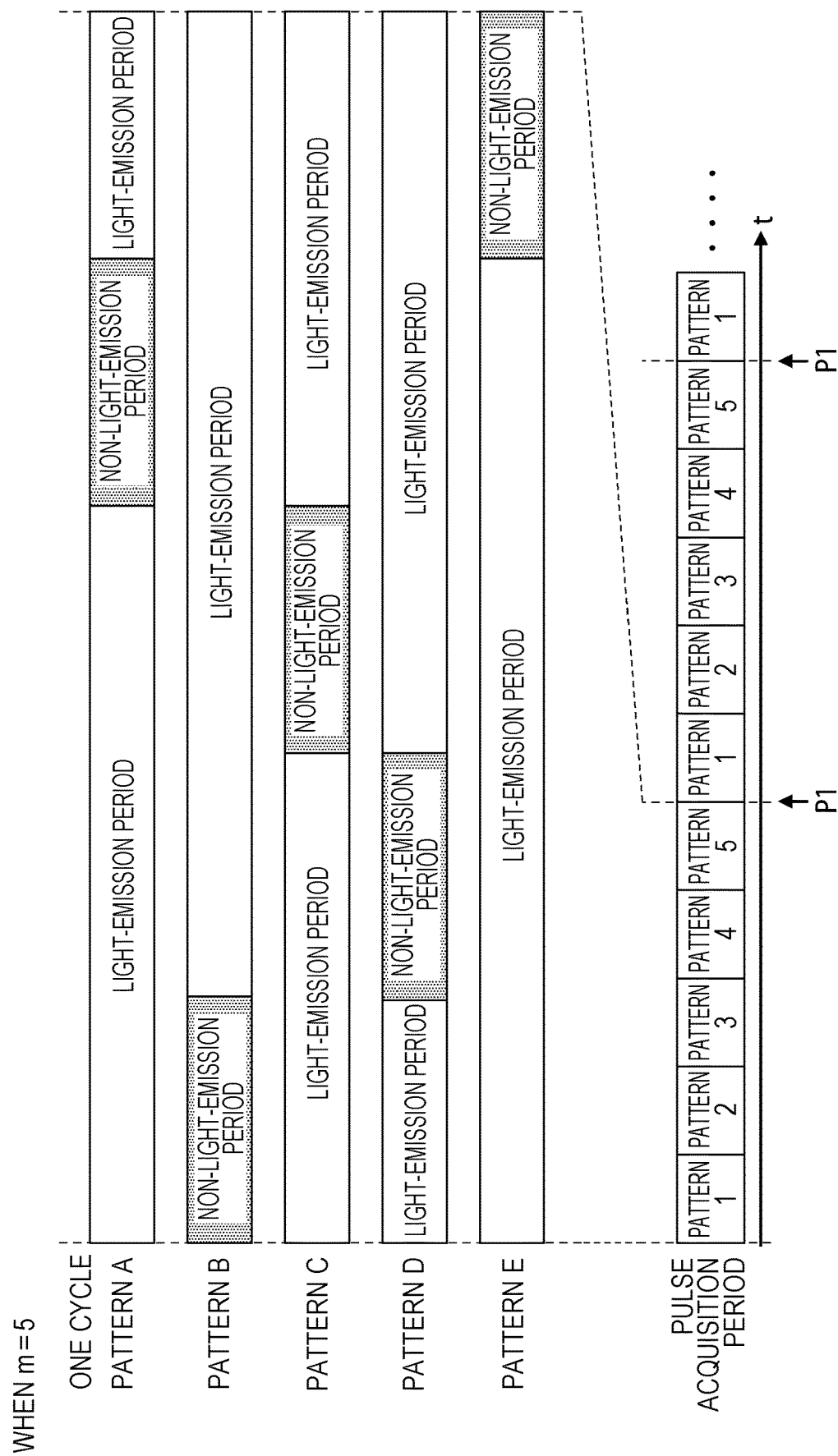
FIG. 9 is a diagram for explaining patterns of timing of a light-emission period and a non-light-emission period in the pulse acquisition period of a TOF sensor according to Embodiment 3 of the present invention.
Figure 10:
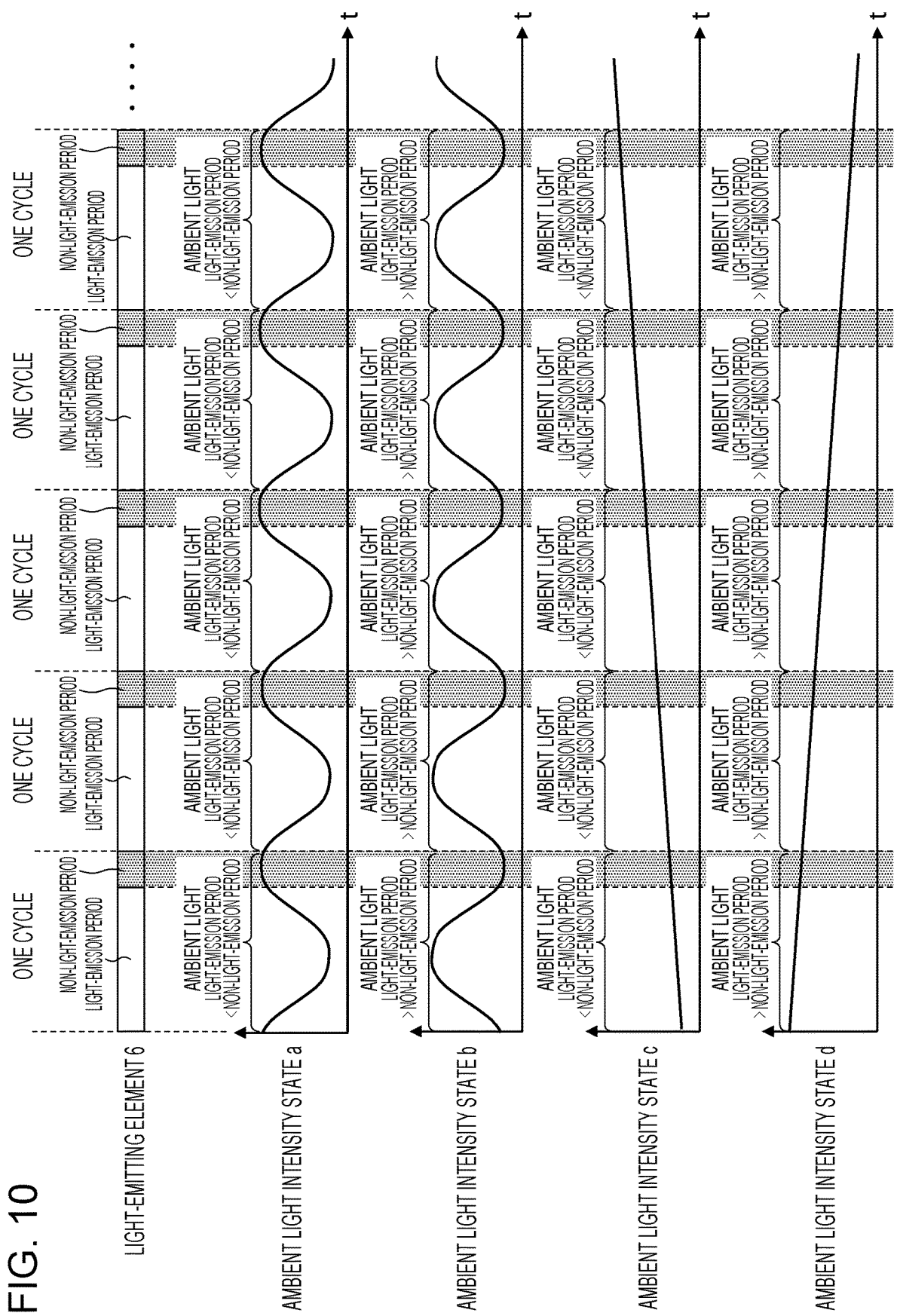
FIG. 10 is a diagram for explaining the influence of ambient light when there is one pattern of timing.
Figure 11:
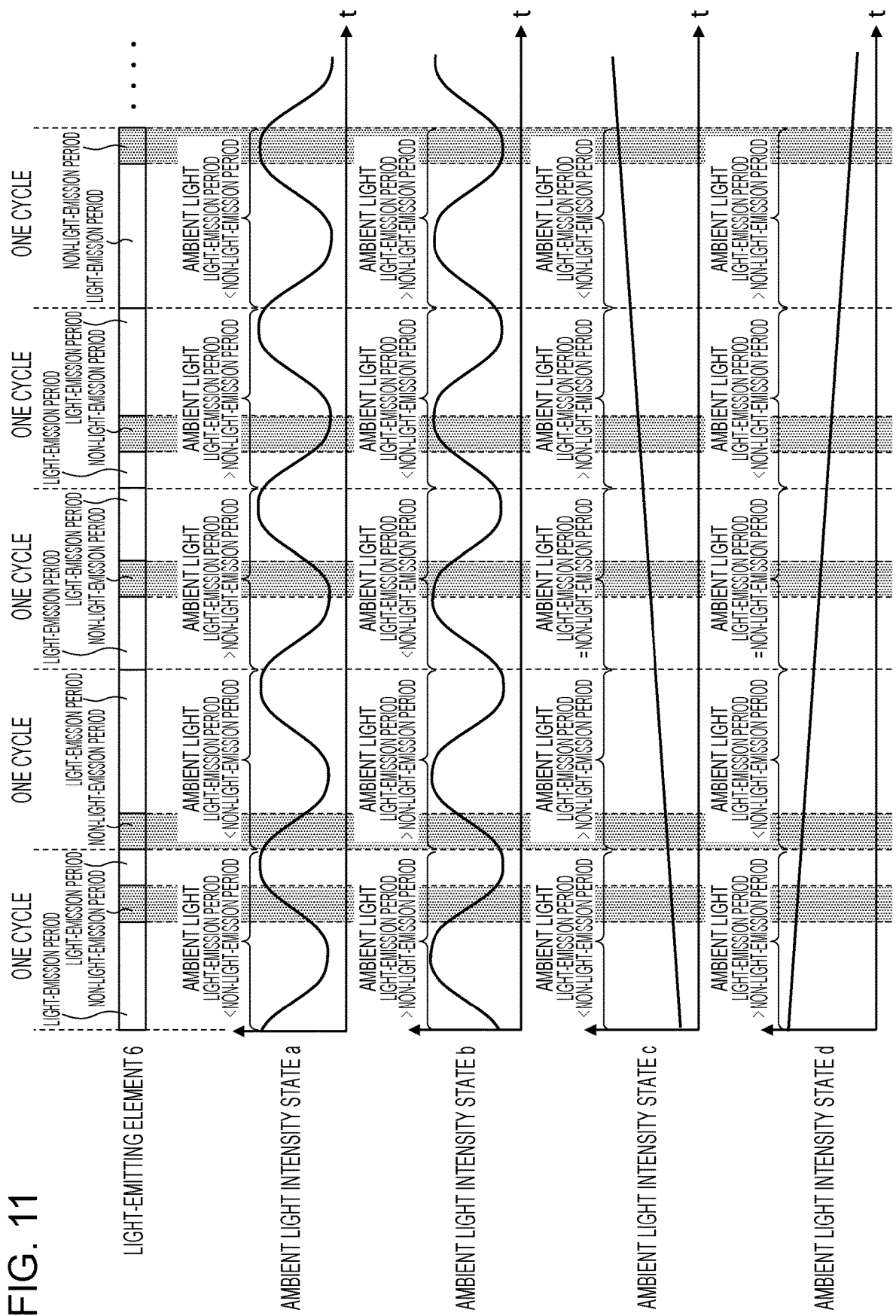
FIG. 11 is a diagram for explaining the influence of the ambient light when there is more than one pattern of timing.
Figure 12:
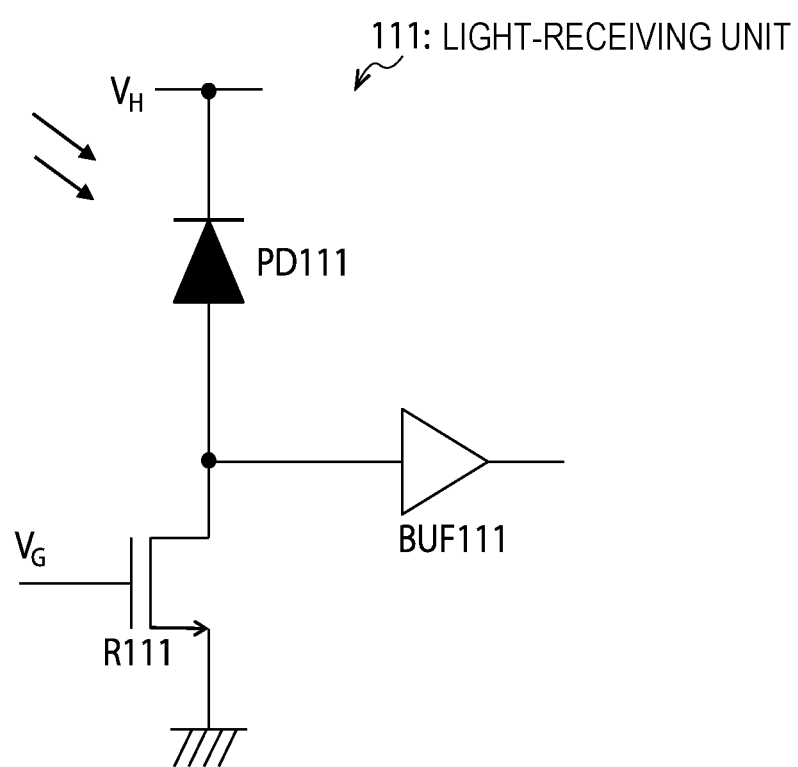
FIG. 12 is a circuit diagram depicting a configuration example of a light-receiving unit using an avalanche photodiode in Geiger mode.

Embodiment 3 of the present invention will be described with reference to FIG. 1 and FIGS. 9 to 11. FIG. 9 is a diagram for explaining patterns of timing of the light-emission period and the non-light-emission period in the pulse acquisition period of a TOF sensor 100B according to Embodiment 3 of the present invention. FIG. 10 is a diagram for explaining the influence of the ambient light when there is one pattern of timing of the light-emission period and the non-light-emission period. FIG. 11 is a diagram for explaining the influence of the ambient light when there is more than one pattern of timing of the light-emission period and the non-light-emission period. The TOF sensor 100B differs from the TOF sensor 100 in that the TOF sensor 100B has m (m≥2) patterns obtained by changing timing with which the light-emission period and the non-light-emission period are performed in one cycle, and the other configuration is similar to that of the TOF sensor 100. In other words, in the present embodiment, in a case of Embodiment 2 where the light-emission period and the non-light-emission period are divided and performed in one cycle, the above-described division method has at least two or more patterns and predetermined periods having the patterns are sequentially performed.

(Changing Timing with which the Light-Emission Period and the Non-Light-Emission Period are Performed in One Cycle)

In FIG. 9, patterns A to E in which settings are made so that the light-emission period T1 and the non-light-emission period T2 are divided in various ways and alternately executed in one cycle are depicted. In each of the patterns A to E, the total time ($t_1$) of the light-emission periods>the total time ($t_2$) of the non-light-emission periods, and the ratio ($t_1$:$t_2$) between the sum of the light-emission periods and the sum of the non-light-emission periods in one cycle is determined by a fixed predetermined time ratio.

Each of the patterns A to E represents one cycle, and, in the pulse acquisition period, an operation is repeated from the execution pattern A to the pattern E in order.

In the present embodiment, by treating the patterns A to E as one group, the first determination circuit 15 determines whether or not the number of first effective pulses which is output from the first digital computation unit 14 is greater than the first reference value with every end of execution of the patterns A to E (every five cycles).

Embodiment 3 is less likely to be affected by a change in ambient light intensity in the pulse acquisition period than Embodiment 1. A detailed explanation will be given below.

In FIG. 10, as in the case of Embodiment 1, the intensity state of the ambient light in the light-emission period and the non-light-emission period when there is one pattern of timing of the light-emission period and the non-light-emission period is depicted. In an ambient light intensity state a and an ambient light intensity state c, a case where the ambient light in synchronism with one cycle is incident on the first light-receiving unit 1 is depicted. In an ambient light intensity state c and an ambient light intensity state d, a case where the ambient light which exhibits a monotonically increase or decrease is incident on the first light-receiving unit 1 is depicted. As depicted in FIG. 10, it is clear that, in the case of the ambient light intensity state a and the ambient light intensity state c, the ambient light is always stronger in the non-light-emission period than in the light-emission period. Furthermore, it is clear that, in the case of the ambient light intensity state c and the ambient light intensity state d, the ambient light is always weaker in the non-light-emission period than in the light-emission period.

As described above, with one pattern of the predetermined time ratio, the frequency of generation of the noise pulses by the ambient light greatly changes in the light-emission period and the non-light-emission period, which becomes a cause of an error at the time of calculation of the number of effective pulses.

By contrast, when five cycles of the patterns A to E are repeated in order in the pulse acquisition period as in the present embodiment, as depicted in FIG. 11, in all of the cases of the ambient light intensity states a to d, a state in which the ambient light in the light-emission period is strong and a state in which the ambient light in the non-light-emission period is strong coexist. This causes the intensity of the ambient light in the light-emission period and the non-light-emission period to be averaged in five cycles and reduces a difference in the average frequency of generation of the noise pulses by the ambient light between the light-emission period and the non-light-emission period, which makes it possible to reduce errors at the time of calculation of the number of effective pulses. As a result, in the present embodiment, even in the case of a monotonically increase or decrease of the ambient light and even for the ambient light, such as an inverter fluorescent lamp, whose intensity changes in an AC manner, it is possible to reduce errors at the time of calculation of the effective pulses and maintain highly accurate measurement even in the ambient light.

Examples of Implementation by Software

The control block of the TOF sensor 100 may be implemented by a logic circuit (hardware) formed in an integrated circuit (an IC chip), for example, or may be implemented by software by using a central processing unit (CPU).

In the latter case, the TOF sensor 100 includes a CPU that executes an instruction of a program which is software implementing the functions, read only memory (ROM) or storage (which will be referred to as a "recording medium") on which the program and various data are recorded in such a way that a computer (or the CPU) can read the program and data, random access memory (RAM) that expands the program, and so forth. Then, as a result of the computer (or the CPU) reading the program from the recording medium and executing the program, the object of the present invention is attained. As the recording medium, "non-transitory tangible media" such as a tape, a disk, a card, semiconductor memory, and a programmable logic circuit can be used. Moreover, the program may be supplied to the computer via an arbitrary transmission medium (such as a communications network or broadcast waves) that can transmit the program. It is to be noted that the present invention can be implemented in the form of a data signal embedded in carrier waves, which is the program embodied by electronic transmission.

BRIEF DESCRIPTION

An optical sensor (the TOF sensors 100, 100A, and 100B) according to Aspect 1 of the present invention includes: a light-emitting unit (the light-emitting element 6) that emits light in accordance with reference pulses; a first light-receiving unit (1) that outputs pulses in response to light incident thereon; a first calculation unit (the first digital computation unit 14) that calculates, based on the number of first output pulses of the first light-receiving unit in response to light incident thereon including reflected light (L2), which is the emitted light of the light-emitting unit reflected from an object, and ambient light (L4), the number of second output pulses of the first light-receiving unit in response to the ambient light incident thereon, and the ratio between a light-emission period (T1) and a non-light-emission period (T2) of the light-emitting unit, the number of third output pulses (the number of first effective pulses) of the first light-receiving unit in response to the reflected light incident thereon; and a distance calculation unit (the distance computation unit 33) that calculates the distance from this device to the object based on the result of comparison between the reference pulses and the output pulses of the first light-receiving unit in the light-emission period if the number of third output pulses is greater than a first reference value.

With the above-described configuration, based on the ratio between the light-emission period and the non-light-emission period, the number of first output pulses output from the first light-receiving unit in response to light incident thereon in the light-emission period, the light including the reflected light which is emitted from the light-emitting unit and reflected from the object and the ambient light, and the number of second output pulses output from the first light-receiving unit in response to the ambient light incident thereon in the non-light-emission period, it is possible to obtain, by computations by the first calculation unit, the number of third output pulses output from the first light-receiving unit when receiving the reflected light.

Moreover, if the number of third output pulses is greater than the first reference value, the distance to the object is obtained by computations by the distance calculation unit based on the output pulses and the reference pulses. This makes it possible to obtain the distance to the object by computations, by setting the first reference value at the number of pieces of valid data required to obtain the accurate distance to the object, as soon as the required number of pieces of valid data can be acquired. As a result, the distance measurement time can be minimized, which makes it possible to perform highly accurate distance measurement in a short time.

In Aspect 1 described above, it is preferable that the optical sensor (the TOF sensors 100, 100A, and 100B) according to Aspect 2 of the present invention includes: a second light-receiving unit (2) that outputs pulses in response to light incident thereon; and a second calculation unit (the second digital computation unit 24) that calculates, based on the number of first internal output pulses of the second light-receiving unit in response to internal reflected light (L3), which is the emitted light of the light-emitting unit reflected inside this device, and the ambient light (L4) incident thereon, the number of second internal output pulses of the second light-receiving unit in response to the ambient light incident thereon, and the ratio, the number of third internal output pulses (the number of second effective pulses) of the second light-receiving unit in response to the internal reflected light incident thereon, and the distance calculation unit (the distance computation unit 33) calculates the distance from this device to the object based on the result of comparison and the result of comparison between the reference pulses and the output pulses of the second light-receiving unit in the light-emission period if the number of third internal output pulses is greater than a second reference value.

With the above-described configuration, based on the ratio between the light-emission period and the non-light-emission period, the number of first internal output pulses output from the second light-receiving unit in response to the internal reflected light, which is the emitted light of the light-emitting unit reflected from a package of this device, and the ambient light incident thereon in the light-emission period, and the number of second internal output pulses output from the second light-receiving unit in response to the ambient light incident thereon in the non-light-emission period, it is possible to obtain, by computations by the second calculation unit, the number of third internal output pulses output from the second light-receiving unit when receiving the internal reflected light.

Moreover, if the number of third output pulses is greater than the first reference value and the number of third internal output pulses is greater than the second reference value, based on the output pulses of the first light-receiving unit, the output pulses of the second light-receiving unit, and the reference pulses, the distance to the object is obtained by computations by the distance calculation unit. This makes it possible to measure the distance from the sensor to the object, by setting the first reference value and the second reference value to the number of pieces of valid data required to obtain the accurate distance to the object, as soon as the required number of pieces of valid data can be acquired.

In Aspect 1 or 2 described above, it is preferable that, in the optical sensor (the TOF sensors 100, 100A, and 100B) according to Aspect 3 of the present invention, the light-emission period (T1) is longer than the non-light-emission period (T2).

With the above-described configuration, by making the light-emission period longer than the non-light-emission period, the required number of pieces of valid data can be acquired more promptly, which makes it possible to further reduce the distance measurement time.

In any one of Aspects 1 to 3 described above, it is preferable that, in the optical sensor (the TOF sensor 100A) according to Aspect 4 of the present invention, the light-emission period (T1) and the non-light-emission period (T2) are divided and alternately performed in a predetermined period so as to have a predetermined ratio.

With the above-described configuration, even in the case of a monotonically increase or decrease of the ambient light and even for the ambient light, such as an inverter fluorescent lamp, whose intensity changes by alternating current (AC), it is possible to reduce errors at the time of obtaining the number of effective pulses by computations and maintain highly accurate measurement even in the ambient light.

In Aspect 4 described above, it is preferable that, in the optical sensor (the TOF sensor 100B) according to Aspect 5 of the present invention, the division method has at least two or more patterns and predetermined periods having the patterns are sequentially performed.

With the above-described configuration, even in the case of a monotonically increase or decrease of the ambient light and even for the ambient light, such as an inverter fluorescent lamp, whose intensity changes by alternating current (AC), it is possible to reduce errors at the time of obtaining the number of effective pulses by computations and maintain highly accurate measurement even in the ambient light.

In any one of Aspects 1 to 5 described above, it is preferable that, in the optical sensor (the TOF sensors 100, 100A, and 100B) according to Aspect 6 of the present invention, the light-emission period (T1) is equal to the non-light-emission period (T2) multiplied by a power of 2.

With the above-described configuration, it is possible to simplify the configuration of the first determination circuit and reduce a circuit size.

In any one of Aspects 1 to 6 described above, it is preferable that, in the optical sensor (the TOF sensors 100, 100A, and 100B) according to Aspect 7 of the present invention, the distance calculation unit (the distance computation unit 33) obtains the distance to the object (50) by computations based on the average time difference between the output pulses and the reference pulses in the light-emission period (T1).

With the above-described configuration, based on the average time difference between the output pulses and the reference pulses in the light-emission period, it is possible to obtain the distance to the object by computations by the distance calculation unit.

In Aspect 2 described above, it is preferable that, in the optical sensor (the TOF sensors 100, 100A, and 100B) according to Aspect 8 of the present invention, at least one of the first light-receiving unit (1) and the second light-receiving unit (2) includes an avalanche photodiode in Geiger mode.

With the above-described configuration, it is possible to detect weak light quickly.

In Aspect 4 described above, it is preferable that the optical sensor (the TOF sensors 100, 100A, and 100B) according to Aspect 9 of the present invention includes a third output pulse number determination unit (the first determination circuit 15) that determines whether or not the number of third output pulses (the number of first effective pulses) is greater than the first reference value and the third output pulse number determination unit makes a determination with every end of n period (n≥1), each being the predetermined period.

With the above-described configuration, it is possible to determine the number of pieces of valid data with every predetermined period.

It is preferable that an electronic device according to Aspect 10 of the present invention includes the optical sensor (the TOF sensors 100, 100A, and 100B) of any one of Aspects 1 to 9 described above.

With the above-described configuration, the effects similar to those of Aspect 1 are obtained.

The TOF sensor according to each aspect of the present invention may be implemented by a computer, and, in this case, a control program of the TOF sensor which implements the TOF sensor by the computer by operating the computer as each unit (a software element) of the TOF sensor and a computer-readable recording medium on which the control program is recorded are also included in the scope of the present invention.

The present invention is not limited to the embodiments described above and various changes are possible within the scope defined by the claims, and an embodiment which is obtained by appropriately combining the technical means disclosed in different embodiments is also included in the technical scope of the present invention. Furthermore, a new technical feature can be formed by combining the technical means disclosed in the embodiments.

REFERENCE SIGNS LIST

1 first light-receiving unit
2 second light-receiving unit
6 light-emitting element (light-emitting unit)
14 first digital computation unit (first calculation unit)
15 first determination circuit (third output pulse number determination unit)
24 second digital computation unit (second calculation unit)
25 second determination circuit
31 first time difference extracting unit
32 second time difference extracting unit
33 distance computation unit (distance calculation unit)
L2 reflected light
L3 internal reflected light
L4 ambient light
L10 first incident light
T1 light-emission period
T2 non-light-emission period
100, 100A, 100B optical sensor

The invention claimed is:

1. An optical sensor comprising:
a light-emitting unit that emits light in accordance with reference pulses;
a first light-receiving unit that outputs pulses in response to light incident thereon;
a first calculation unit that calculates, based on a number of first output pulses of the first light-receiving unit in response to light incident thereon including reflected light, which is emitted light of the light-emitting unit reflected from an object, and ambient light, a number of second output pulses of the first light-receiving unit in response to the ambient light incident thereon, and a ratio between a light-emission period and a non-light-emission period of the light-emitting unit, a number of third output pulses of the first light-receiving unit in response to the reflected light incident thereon; and
a distance calculation unit that calculates a distance from this device to the object based on a result of comparison between the reference pulses and output pulses of the first light-receiving unit in the light-emission period if the number of third output pulses is greater than a first reference value.

2. The optical sensor according to claim 1, comprising:
a second light-receiving unit that outputs pulses in response to light incident thereon; and
a second calculation unit that calculates, based on a number of first internal output pulses of the second light-receiving unit in response to internal reflected light, which is emitted light of the light-emitting unit reflected inside this device, and the ambient light incident thereon, a number of second internal output pulses of the second light-receiving unit in response to the ambient light incident thereon, and the ratio, a number of third internal output pulses of the second light-receiving unit in response to the internal reflected light incident thereon, wherein
the distance calculation unit calculates the distance from this device to the object based on the result of comparison and a result of comparison between the reference pulses and output pulses of the second light-receiving unit in the light-emission period if the number of third internal output pulses is greater than a second reference value.

3. The optical sensor according to claim 1, wherein
the light-emission period is longer than the non-light-emission period.

4. The optical sensor according to claim 1, wherein
a division method comprises the light-emission period and the non-light-emission period, the light-emission period and the non-light-emission period are divided and alternately performed in a predetermined period so as to have a predetermined ratio.

5. The optical sensor according to claim 4, wherein the division method has at least two or more patterns and predetermined periods having the patterns are sequentially performed.

6. The optical sensor according to claim 1, wherein the light-emission period is equal to the non-light-emission period multiplied by a power of 2.

7. The optical sensor according to claim 1, wherein the distance calculation unit obtains the distance to the object by computations based on an average time difference between the output pulses and the reference pulses in the light-emission period.

8. The optical sensor according to claim 2, wherein at least one of the first light-receiving unit and the second light-receiving unit includes an avalanche photodiode in Geiger mode.

9. The optical sensor according to claim 4, comprising: a third output pulse number determination unit that determines whether or not the number of third output pulses is greater than the first reference value, wherein the third output pulse number determination unit makes a determination with every end of n period (n≥1), each being the predetermined period.

10. An electronic device comprising: the optical sensor according to claim 1.

* * * * *